(12) United States Patent
Waku

(10) Patent No.: US 11,487,553 B2
(45) Date of Patent: Nov. 1, 2022

(54) PARALLEL PROCESSING APPARATUS OF CONTROLLING NODE ACTIVATION TIMING, NODE ACTIVATION METHOD OF CONTROLLING NODE ACTIVATION TIMING, AND NON-TRANSITORY COMPUTER-READABLE STORAGE MEDIUM FOR STORING PROGRAM OF CONTROLLING NODE ACTIVATION TIMING

(71) Applicant: FUJITSU LIMITED, Kawasaki (JP)

(72) Inventor: Akihiro Waku, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 349 days.

(21) Appl. No.: 16/713,046

(22) Filed: Dec. 13, 2019

(65) Prior Publication Data

US 2020/0241885 A1 Jul. 30, 2020

(30) Foreign Application Priority Data

Jan. 24, 2019 (JP) .............................. JP2019-010296

(51) Int. Cl.
*G06F 9/445* (2018.01)
*G06F 9/38* (2018.01)
*G06F 9/54* (2006.01)
*G06F 9/32* (2018.01)

(52) U.S. Cl.
CPC .............. *G06F 9/445* (2013.01); *G06F 9/321* (2013.01); *G06F 9/3885* (2013.01); *G06F 9/542* (2013.01); *G06F 9/546* (2013.01)

(58) Field of Classification Search
CPC ........ G06F 9/445; G06F 9/321; G06F 9/3885; G06F 9/542; G06F 9/546; G06F 9/4881
See application file for complete search history.

(56) References Cited

U.S. PATENT DOCUMENTS

| | | | |
|---|---|---|---|
| 8,468,226 B2* | 6/2013 | Nagai | G06F 8/63 709/222 |
| 9,665,380 B2* | 5/2017 | Hiltgen | G06F 9/4416 |
| 2005/0256942 A1* | 11/2005 | McCardle | G06F 11/3495 709/220 |
| 2006/0085555 A1* | 4/2006 | Kelly | G06F 9/4416 709/238 |

(Continued)

FOREIGN PATENT DOCUMENTS

| | | |
|---|---|---|
| JP | 2001-249908 A | 9/2001 |
| JP | 2015-11357 A | 1/2015 |

*Primary Examiner* — Raymond N Phan
(74) *Attorney, Agent, or Firm* — Fujitsu Patent Center

(57) ABSTRACT

A parallel processing apparatus includes: a first node including a storage unit that stores a program, the first node being activated when the program loaded from the storage unit is executed; a second node activated when the program loaded from the storage unit of the first node is executed; and a control unit configured to execute a setting process for setting a state where the program may be loaded to each of the first node and the second node, wherein the control unit starts the setting process on the second node after a predetermined time elapses since start of the setting process on the first node, and wherein the predetermined time is a time at which an activation completion timing of the first node is aligned with a completion timing of the setting process on the second node.

7 Claims, 11 Drawing Sheets

(56) References Cited

U.S. PATENT DOCUMENTS

| | | | |
|---|---|---|---|
| 2010/0023742 A1* | 1/2010 | Chen | G06F 9/4408 |
| | | | 713/2 |
| 2015/0006874 A1* | 1/2015 | Fujiwara | G06F 9/4416 |
| | | | 713/2 |

* cited by examiner

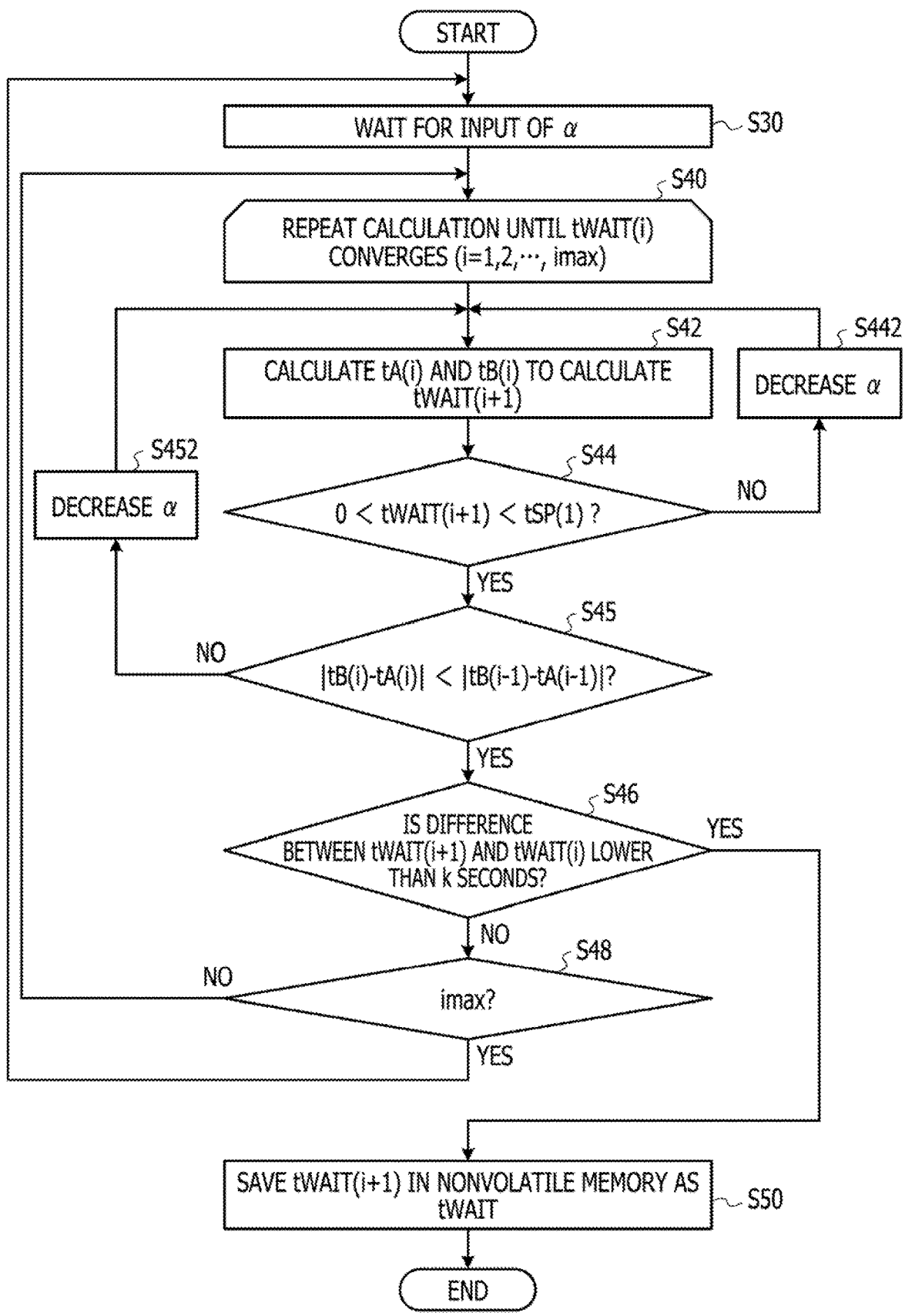

PARALLEL PROCESSING APPARATUS OF CONTROLLING NODE ACTIVATION TIMING, NODE ACTIVATION METHOD OF CONTROLLING NODE ACTIVATION TIMING, AND NON-TRANSITORY COMPUTER-READABLE STORAGE MEDIUM FOR STORING PROGRAM OF CONTROLLING NODE ACTIVATION TIMING

CROSS-REFERENCE TO RELATED APPLICATION

This application is based upon and claims the benefit of priority of the prior Japanese Patent Application No. 2019-10296, filed on Jan. 24, 2019, the entire contents of which are incorporated herein by reference.

FIELD

The embodiments discussed herein are related to a parallel processing apparatus, a node activation method, and a non-transitory computer-readable storage medium for storing a node activation program.

BACKGROUND

In a parallel processing apparatus in which a plurality of computing machines execute processing in parallel, when the plurality of computing machines are activated at the same time, accesses to download a program such as an operating system (OS) from a common storage concentrate, and it takes much time to perform activation process. A technique has been proposed for shortening an activation time by separating the computing machines into groups and activating the computing machines for each group with a time difference to disperse the accesses to the common storage.

An information processing system has also been proposed which includes a first node for managing activation data such as an OS image, a second node for performing activation by using the activation data obtained from the first node, and a managing apparatus that manages the first node and the second node. When the information processing system of this type is operated, first, the managing apparatus causes the first node and the second node to start activation. When activation completion of the OS of the first node is detected based on information obtained from the managing apparatus, the second node that has started the activation obtains activation data from the first node, and activates the OS using the obtained activation data.

Examples of the related art include Japanese Laid-open Patent Publication No. 2001-249908 and Japanese Laid-open Patent Publication No. 2015-11357.

SUMMARY

According to an aspect of the embodiments, a parallel processing apparatus includes: a first node including a storage unit that stores a program, the first node being activated when the program loaded from the storage unit is executed; a second node activated when the program loaded from the storage unit of the first node is executed; and a control unit configured to execute a setting process for setting a state where the program may be loaded to each of the first node and the second node, wherein the control unit starts the setting process on the second node after a predetermined time elapses since start of the setting process on the first node, and wherein the predetermined time is a time at which an activation completion timing of the first node is aligned with a completion timing of the setting process on the second node.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 11 is a diagram illustrating an example of the operation flow for causing the waiting time to converge which is executed by the service processor of the parallel processing apparatus according to another embodiment.

DESCRIPTION OF EMBODIMENTS

In the above-mentioned information processing system, after the activation data is obtained from the first node, the second node implements the activation process of the OS. For this reason, the second node does not start the activation process of the OS unless the first node completes the activation of the OS. As compared with a case where the first node and the second node are caused to sequentially execute the activation process, the activation time of the information processing system may be shortened when the first node and the second node are caused to execute the activation process in parallel. However, when the second node waits to start the activation process of the OS until the activation of the OS of the first node is completed, the activation time of the information processing system is lengthened, and start of an operation of the information processing system is delayed.

According to one embodiment, the present disclosure aims at shortening an activation time of a parallel processing apparatus.

According to one embodiment, the activation time of the parallel processing apparatus may be shortened in accordance with the present disclosure.

Hereinafter, embodiments will be described with reference to the drawings.

Figure 1:
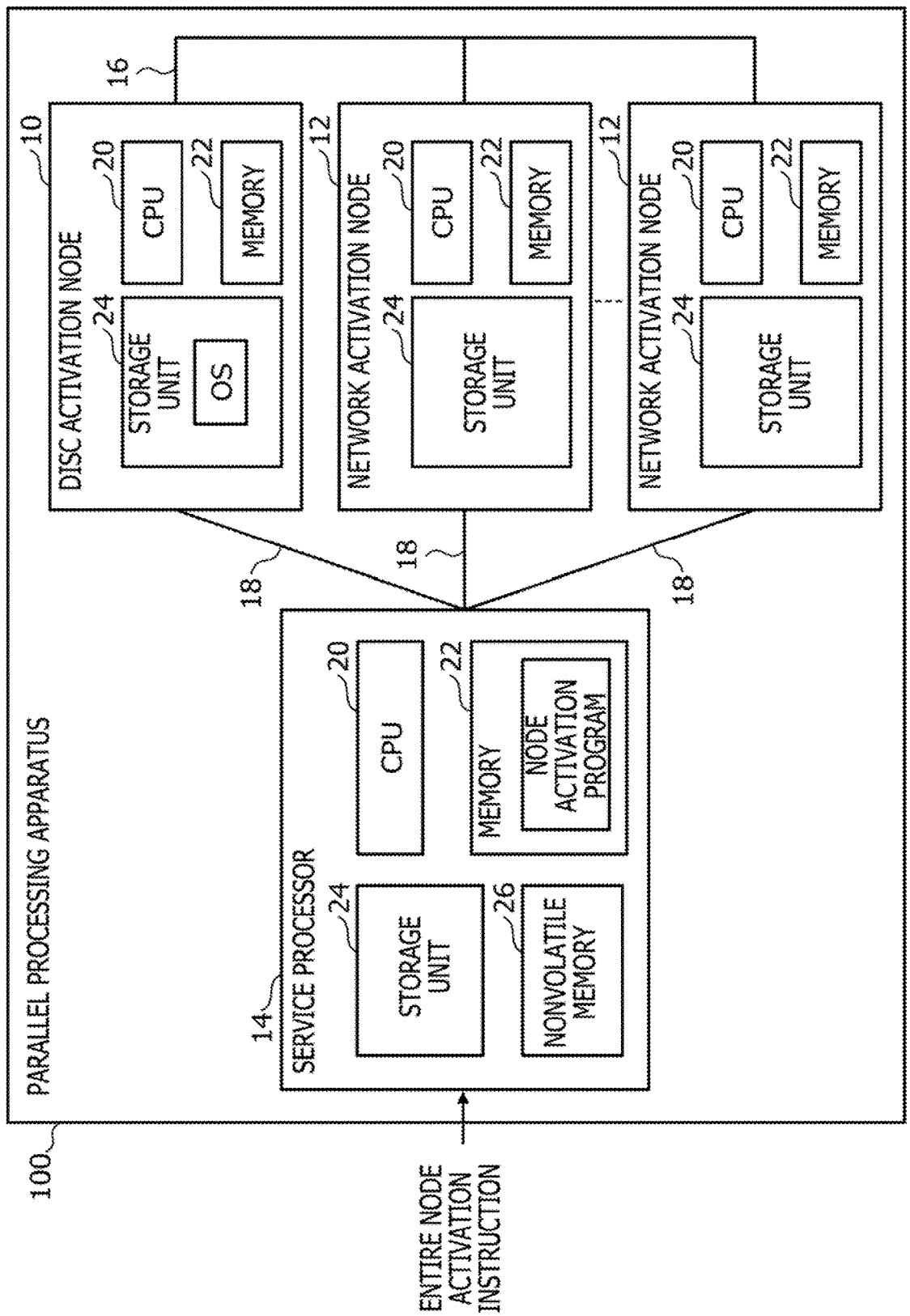
FIG. 1 is a diagram illustrating an example of a parallel processing apparatus according to an embodiment.

FIG. 1 illustrates an example of a parallel processing apparatus according to an embodiment. A parallel processing apparatus 100 illustrated in FIG. 1 includes a disc activation node 10, a plurality of network activation nodes 12, and a service processor 14. The disc activation node 10 and the plurality of network activation nodes 12 are mutually coupled via a communication line 16 (for example, a network). The disc activation node 10, the plurality of network activation nodes 12, and the service processor 14 are coupled to one another via a communication line 18. The disc activation node 10 is an example of a first node, the network activation node 12 is an example of a second node, and the service processor 14 is an example of a control unit and a computer. The number of network activation nodes 12 may also be one.

The disc activation node 10 and the network activation node 12 include a central processing unit (CPU) 20, a memory 22, and a storage unit 24. The CPU 20 executes programs such as an operating system (OS) and application programs held in the memory 22 of its own node 10 or its own node 12. For example, the memory 22 is a main storage device or the like, and the storage unit 24 is an auxiliary storage device such as a hard disk drive (HDD) or a solid state drive (SSD).

The storage unit 24 of the disc activation node 10 stores an OS (for example, an OS image) executed by the disc activation node 10 and the network activation node 12. The OS running on the disc activation node 10 may be different from the OS running on the network activation node 12. The OS is an example of a program loaded and executed to activate the disc activation node 10 and each of the network activation nodes 12.

After a power source is turned on by the service processor 14, the disc activation node 10 is set in a state where the OS may be executed by a setting process by the service processor 14. After the setting process is completed, the disc activation node 10 develops and executes the OS held by the storage unit 24 such as a hard disc drive on the memory 22 to be activated.

Similarly as in the disc activation node 10, after the power source is turned on by the service processor 14, the respective network activation nodes 12 are set in a state where the OS may be executed by the setting process by the service processor 14. The storage units 24 of the respective network activation nodes 12 do not store the OS. For this reason, the respective network activation nodes 12 download the OS stored in the storage unit 24 of the disc activation node 10 into the storage unit 24 of its node via a network such as the communication line 16, develop the OS on the memory 22, and execute the OS to be activated. The respective network activation nodes 12 are put into a state where information processing such as computing processing by the CPU 20 may be executed. Therefore, the respective network activation nodes 12 do not start to download the OS until the activation of the disc activation node 10 is completed.

The disc activation node 10 is a node to be activated using the OS held by the disc (for example, the storage unit 24) of its own node. The network activation node 12 is a node to be activated when the OS held by the storage unit 24 of the other node such as the disc activation node 10 is loaded via the network (for example, the communication line 16).

The service processor 14 includes the CPU 20, the memory 22, and the storage unit 24 similarly as in the disc activation node 10 and the network activation node 12. The service processor 14 may include a rewritable nonvolatile memory 26 such as a flash memory that stores a waiting time tWAIT which will be described below.

For example, the service processor 14 executes the node activation program stored in the memory 22 to execute a setting process for performing an initial setup or the like with respect to the disc activation node 10 and each of the network activation nodes 12. That is, for example, a node activation method of activating the disc activation node 10 and the network activation nodes 12 is realized by execution of the node activation program. For example, the service processor 14 starts a setting process on the network activation nodes 12 after a predetermined time elapses since the setting process on the disc activation node 10 is started.

When an instruction for activating the disc activation node 10 and all of the network activation nodes 12 is received from a control server or the like that is not illustrated which manages the parallel processing apparatus 100, the service processor 14 turns on a power source for the disc activation node 10 and the network activation nodes 12. The service processor 14 starts the setting process on the disc activation node 10 and the network activation nodes 12. The setting process is a process for setting the state of each of the nodes 10 and 12 into a state where the OS may be downloaded, and is, for example, a process for performing the initial setup on hardware resources included in the respective nodes 10 and 12 such as the CPUs 20. The control server may issue an activation instruction to not only the parallel processing apparatus 100 illustrated in FIG. 1 but also other parallel processing apparatuses 100 that are not illustrated.

The service processor 14 may control the states of the disc activation node 10 and the network activation nodes 12 by executing a control program that is not illustrated. For example, the service processor 14 includes a function of a baseboard management controller (BMC) and may implement power source management, obtainment of various information such as a temperature and a voltage, management of a clock frequency, and the like with respect to the disc activation node 10 and the network activation nodes 12. The node activation program may be included in the control program.

Figure 2:
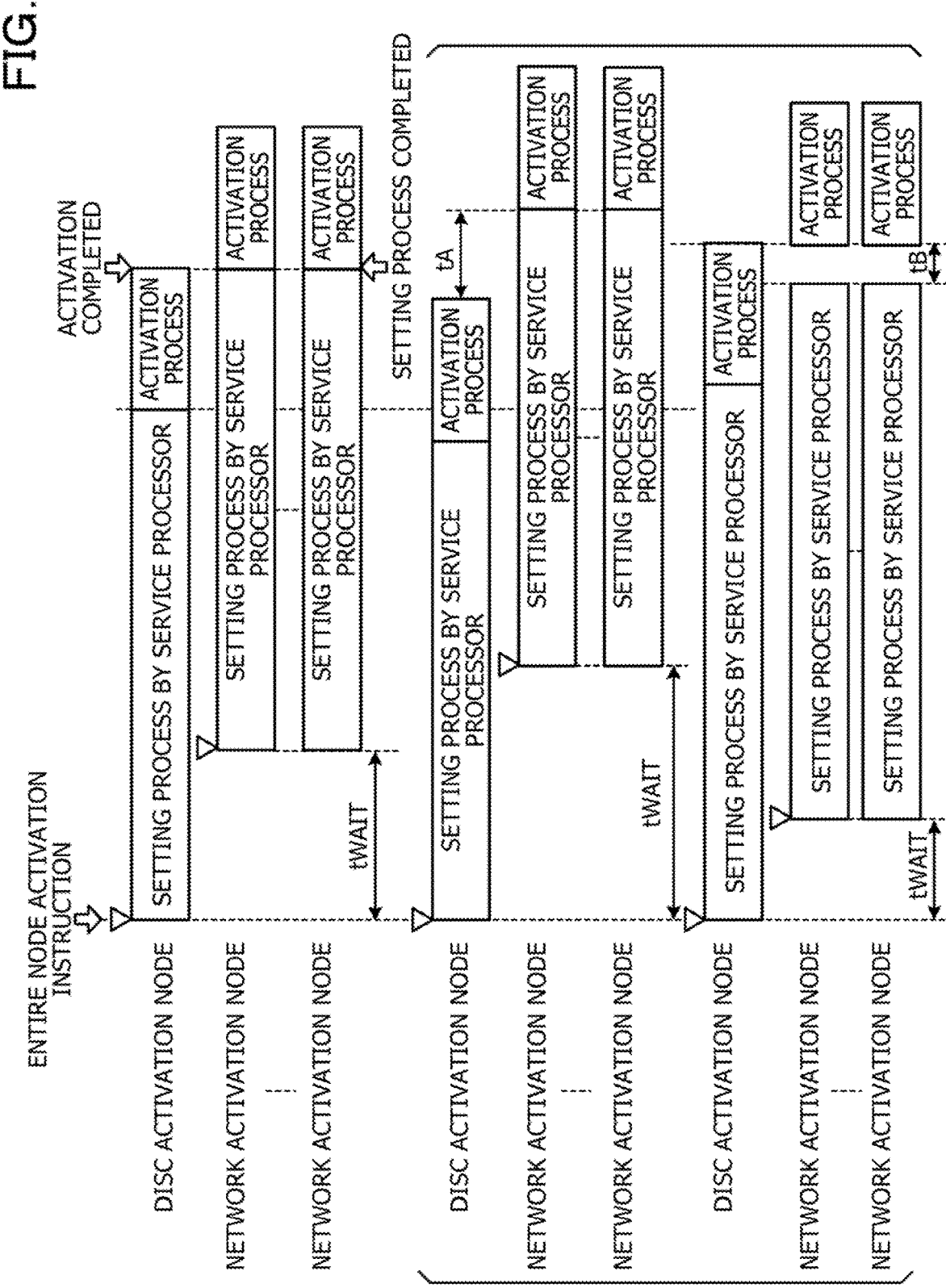
FIG. 2 is a diagram illustrating an example of control on activation of a disc activation node and a network activation node by a service processor in FIG. 1.

FIG. 2 illustrates an example of control on activation of the disc activation node 10 and the network activation nodes 12 by the service processor 14 in FIG. 1. That is, for example, FIG. 2 illustrates a node activation method by the service processor 14. For example, the control on the activation by the service processor 14 is realized by the node activation program executed by the CPU 20 of the service processor 14. A down-pointing triangle illustrated in FIG. 2 represents a starting timing of the setting process by the service processor 14. Contents enclosed in angle brackets on a lower side in FIG. 2 indicate operations when the waiting time tWAIT which will be described below is changed as a comparative example.

When an entire node activation instruction for activating the disc activation node 10 and all of the network activation nodes 12 is received, first, the service processor 14 starts the setting process on the disc activation node 10. The service processor 14 starts the setting process on the network activation nodes 12 after the waiting time tWAIT elapses since the setting process on the disc activation node 10 is started. The waiting time tWAIT is an example of the predetermined time.

The disc activation node 10 develops the OS held by the storage unit 24 of its own node 10 on the memory 22 based on the completion of the setting process and executes an activation process for activating the OS. The activation process by the disc activation node 10 is the initial setup on a communication interface or the like with which the OS may be transferred to the network activation nodes 12 and may include a process to be executed after execution of the OS.

The setting process on the network activation nodes 12 in which the setting process is started with a delay by the waiting time tWAIT is completed later than the completion of the setting process on the disc activation node 10. The service processor 14 sets the waiting time tWAIT such that a difference (absolute value) between an activation completion timing of the disc activation node 10 and a completion timing of the setting process on the network activation nodes 12 falls within a predetermined threshold time. For example, the threshold time is shorter than gaps tA and tB which will be described below. In other words, for example, the activation completion timing of the disc activation node 10 is aligned with the completion timing of the setting process on the network activation nodes 12 by the setting of the waiting time tWAIT.

Accordingly, after the completion of the activation process on the disc activation node 10, the activation process on the network activation nodes 12 may be immediately started. As a result, for example, as compared with a case where the setting process on the disc activation node 10 and the setting process on the network activation nodes 12 are started at the same time, a time from when the entire node activation instruction is issued until the information processing by the network activation nodes 12 becomes executable may be shortened. That is, for example, the activation time of the parallel processing apparatus 100 may be shortened.

Contents enclosed in the angle brackets on an upper side indicate an example of operations when the waiting time tWAIT is lengthened. When the waiting time tWAIT is lengthened, a time in which the setting process on the disc activation node 10 is overlapped with the setting process on the network activation nodes 12 is shortened. Accordingly, a time in which loads concentrate in the service processor 14 is reduced, and a time for each setting process is shortened. However, reduction amounts in the setting processes on the disc activation node 10 and the network activation nodes 12 are different from each other.

With regard to the contents enclosed in the angle brackets on the upper side, the completion timing of the setting process on the network activation nodes 12 is delayed by a time approximately corresponding to an increased amount of the waiting time tWAIT as compared with the completion timing of the activation process on the disc activation node 10. Even when the activation process on the disc activation node 10 is completed, the network activation nodes 12 do not download the OS from the disc activation node 10 until the setting process is completed, and the activation process is not started. Accordingly, the temporal gap to occurs between the completion of the activation process on the disc activation node 10 and the start of the activation process on the network activation nodes 12, and the activation time of the parallel processing apparatus 100 is increased.

Contents enclosed in the angle brackets on the lower side indicate an example of operations when the waiting time tWAIT is shortened. When the waiting time tWAIT is shortened, the time in which the setting process on the disc activation node 10 is overlapped with the setting process on the network activation nodes 12 is lengthened. Accordingly, the time in which the loads concentrate in the service processor 14 is increased, and the time for each setting process is lengthened.

With regard to the contents enclosed in the angle brackets on the lower side, the completion timing of the activation process on the disc activation node 10 is delayed by a time approximately corresponding to a decreased amount of the waiting time tWAIT as compared with the completion timing of the setting process on the network activation nodes 12. The network activation nodes 12 do not download the OS from the disc activation node 10 until the activation process on the disc activation node 10 is completed, and the activation process is not started. Accordingly, the temporal gap tB occurs between the completion of the setting process and the start of the activation process on the network activation nodes 12. As described above, since the waiting time tWAIT is shortened, the setting process time on the disc activation node 10 is lengthened. Therefore, the completion timing of the activation process on the network activation nodes 12 is delayed, and the activation time of the parallel processing apparatus 100 is increased.

Such an optimal waiting time tWAIT that the difference between the activation completion timing of the disc activation node 10 and the completion timing of the setting process on the network activation nodes 12 falls within the predetermined threshold time varies in accordance with the number of network activation nodes 12 included in the parallel processing apparatus 100. A relationship between the waiting time tWAIT and the gaps tA and tB varies in accordance with the number of network activation nodes 12 included in the parallel processing apparatus 100.

For this reason, at the time of the activation of the parallel processing apparatus 100, the service processor 14 may obtain the gap tA (or tB) corresponding to the difference between the activation completion timing of the disc activation node 10 and the completion timing of the setting process on the network activation nodes 12. When the gap tA occurs, the gap tB does not occur (tB=0), and when the gap tB occurs, the gap tA does not occur (tA=0). Therefore, when an absolute value of a difference between the gaps tA and tB is calculated, the gap tA (or tB) may be obtained without determining whether or not any one of the gaps tA and tB is "0". When the obtained gap tA (or tB) exceeds the threshold time, the service processor 14 may correct the waiting time tWAIT such that the difference falls within the predetermined threshold time. The threshold time is an example of a second time.

The service processor 14 may repeatedly correct the waiting time tWAIT until a correction amount of the waiting time tWAIT falls within the predetermined time. The service processor 14 may instead repeatedly correct the waiting time tWAIT until the difference falls within the threshold time. Hereinafter, the obtainment of the above-mentioned difference and the correction of the waiting time tWAIT may also be referred to as a correction process on the waiting time tWAIT. The correction process on the waiting time tWAIT may be realized by the node activation program executed by the service processor 14.

When the activation completion timing of the disc activation node 10 is earlier than the completion timing of the setting process on the network activation nodes 12, the service processor 14 shortens the waiting time tWAIT. When the activation completion timing of the disc activation node 10 is later than the completion timing of the setting process on the network activation nodes 12, the service processor 14 lengthens the waiting time tWAIT. Accordingly, even in the parallel processing apparatus 100 in which the optimal waiting time tWAIT is not found, the optimal waiting time tWAIT may be set. Irrespective of the configuration such as the number of nodes in the parallel processing apparatus 100, the optimal waiting time tWAIT may be set.

For example, the service processor 14 may execute the correction process on the waiting time tWAIT in an examination process before shipment of the parallel processing apparatus 100 and decide the optimal waiting time tWAIT indicated in operations on an upper side in FIG. 2. For example, the correction process on the waiting time tWAIT is executed when an operation mode of the parallel processing apparatus 100 is shifted from a normal mode to an examination mode. The normal mode is a mode (user mode) that is set when a user or the like who uses the parallel processing apparatus 100 executes the information processing. For example, in the examination mode, the node activation program executes the correction process on the waiting time tWAIT, and in the normal mode, the node activation program executes a process for starting the setting process on the network activation nodes 12 with a delay by the waiting time tWAIT since the start of the setting process on the disc activation node 10.

The decided waiting time tWAIT may be stored in the nonvolatile memory 26 included in the service processor 14. The service processor 14 of the parallel processing apparatus 100 installed in a shipping destination starts the setting process on the disc activation node 10 at the time of the activation of the parallel processing apparatus 100 that operates in the normal mode. The service processor 14 refers to the waiting time tWAIT held in the nonvolatile memory 26 and starts the setting process on the network activation nodes 12 with a delay by the waiting time tWAIT since the setting process on the disc activation node 10 is started.

The correction process on the waiting time tWAIT may be executed in the shipping destination of the parallel processing apparatus 100. In this case, the correction process on the waiting time tWAIT may be executed at the time of maintenance of the parallel processing apparatus 100, and may also be executed at any timing based on an instruction from a terminal device operated by an administrator who manages the parallel processing apparatus 100.

According to the embodiment illustrated above in FIG. 1 and FIG. 2, after the completion of the activation process on the disc activation node 10, the activation process on the network activation nodes 12 may be immediately started by the setting of the waiting time tWAIT. As a result, for example, as compared with a case where the setting process on the disc activation node 10 and the network activation nodes 12 is started at the same time, the time from when the activation instruction is issued until the information processing by the network activation nodes 12 becomes executable may be shortened. That is, for example, the activation time of the parallel processing apparatus 100 may be shortened.

The service processor 14 corrects the waiting time tWAIT based on the difference between the activation completion timing of the disc activation node 10 and the completion timing of the setting process on the network activation nodes 12 such that the difference is decreased. Accordingly, even in the parallel processing apparatus 100 in which the optimal waiting time tWAIT is not found, the optimal waiting time tWAIT may be set. Irrespective of the configuration such as the number of nodes in the parallel processing apparatus 100, the optimal waiting time tWAIT may be set. In other words, for example, the optimal waiting time tWAIT may be set for each of the parallel processing apparatuses 100 having different configurations.

Figure 3:
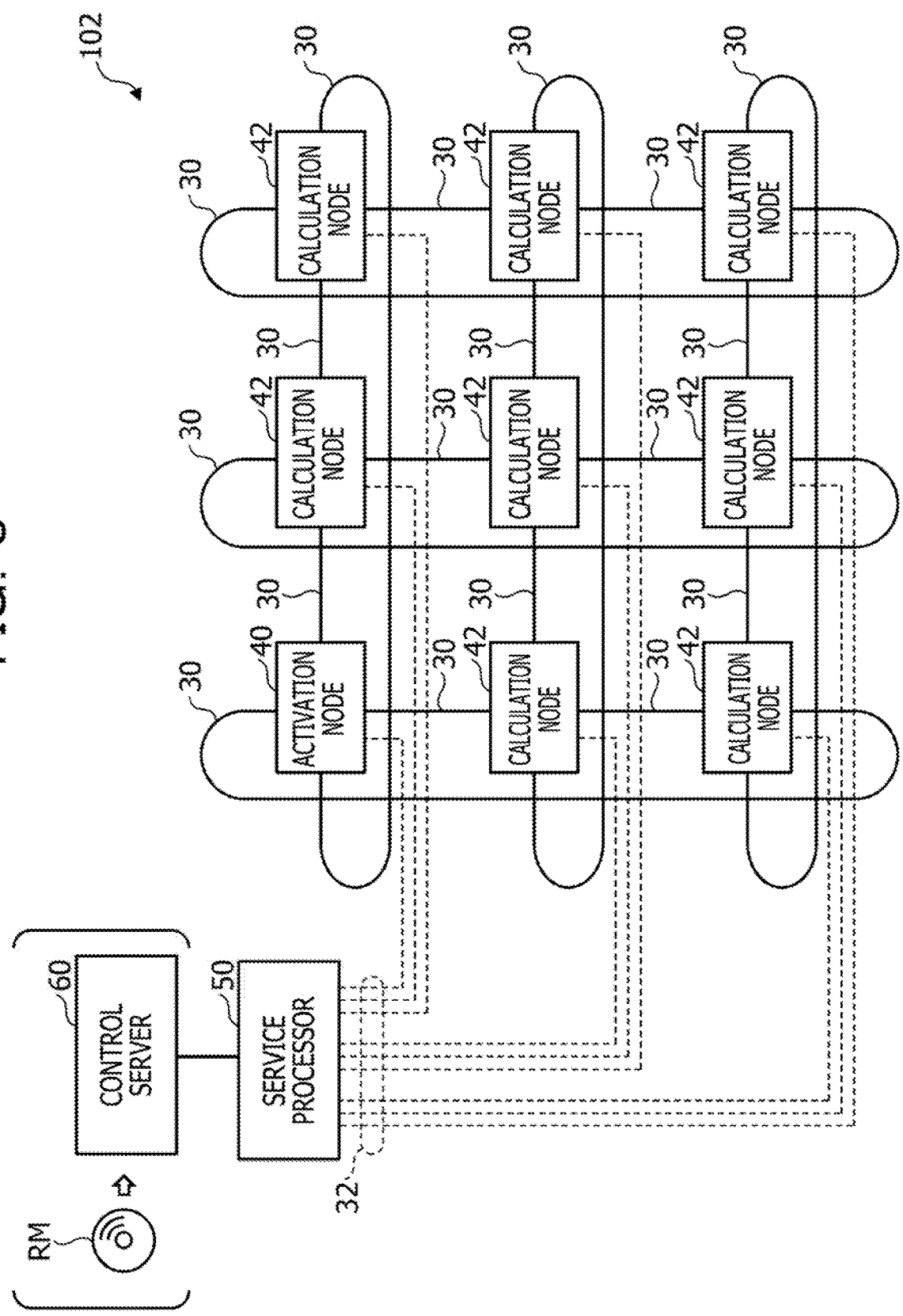
FIG. 3 is a diagram illustrating an example of the parallel processing apparatus according to another embodiment.

FIG. 3 illustrates an example of the parallel processing apparatus according to another embodiment. Detailed descriptions of the same components as those in FIG. 1 are omitted. A parallel processing apparatus 102 illustrated in FIG. 3 includes an activation node 40 and a plurality of calculation nodes 42 which are mutually coupled via a plurality of cables 30, and a service processor 50 coupled to the activation node 40 and each of the calculation nodes 42 via cables 32. The cables 30 and 32 are examples of communication lines. The activation node 40 is an example of the first node, the calculation node 42 is an example of the second node, and the service processor 50 is an example of the control unit and the computer.

In the parallel processing apparatus 102 in FIG. 3, the activation node 40 and the plurality of calculation nodes 42 are mutually coupled by a two-dimensional torus network, but the total number of nodes and a network topology are not limited to FIG. 3. A location of the activation node 40 on the network is not limited to FIG. 3. Hereinafter, when the activation node 40 and the calculation nodes 42 are not to be distinguished from each other, those nodes will be simply referred to as the nodes 40 and 42.

The activation node 40 corresponds to the disc activation node 10 in FIG. 1 and includes, although not illustrated, the CPU 20, the memory 22, and the storage unit 24 that stores the OS, similarly as in the disc activation node 10. The calculation node 42 corresponds to the network activation node 12 in FIG. 1 and includes, although not illustrated, the CPU 20, the memory 22, and the storage unit 24 that does not store the OS in the initial state, similarly as in the network activation node 12. The service processor 50 includes a function similar to the service processor 14 in FIG. 1 and includes, although not illustrated, the CPU 20, the memory 22, and the storage unit 24, similar to the nodes 40 and 42. The service processor 50 may include a nonvolatile memory 26.

The service processor 50 is coupled in parallel with all the nodes 40 and 42 via the cables 32 and may respectively individually communicate with all the nodes 40 and 42. For example, the service processor 50 executes the node activation program held in the memory 22 (not illustrated) and executes the activation process on the nodes 40 and 42. The service processor 50 is coupled to a control server 60 that manages an operation of the parallel processing apparatus 102. The control server 60 includes an input/output interface for coupling a recording medium RM such as a compact disk read-only memory (CD-ROM), a digital versatile memory (DVD) or a Universal Serial Bus (USB) memory that records the node activation program. The node activation program may be loaded to the service processor 50 via the control server from the recording medium RM that records the node activation program.

For example, the parallel processing apparatus 102 is constructed by storing a plurality of system boards respectively including a predetermined number of nodes 40 and 42 in a rack (casing) or the like, and mutually coupling the nodes 40 and 42 via cables 30. At this time, the service processor 50 may be contained in the rack.

Figure 4:
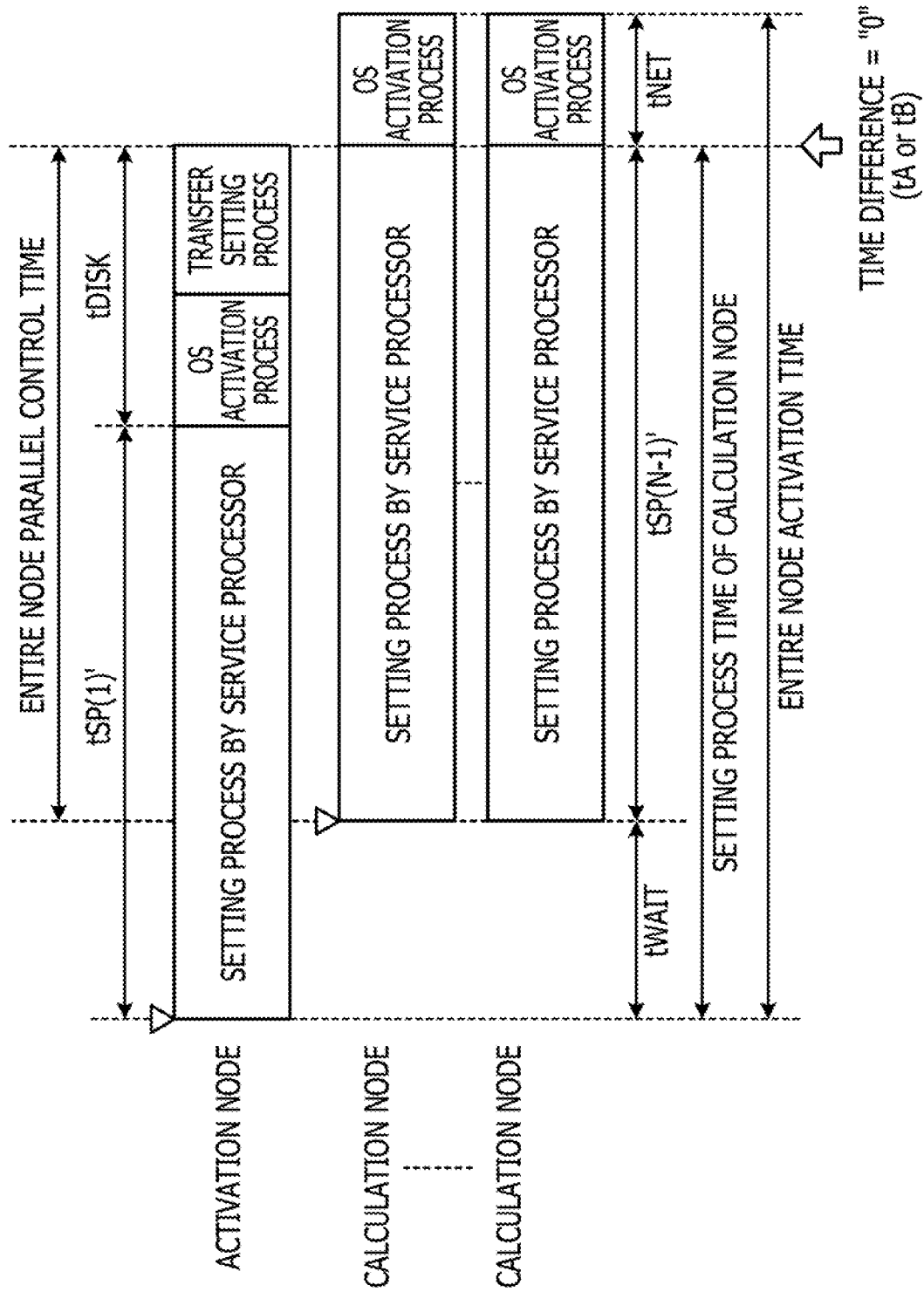
FIG. 4 is a diagram illustrating an example of control on activation of an activation node and a calculation node by the service processor in FIG. 3.

FIG. 4 illustrates an example of control on activation of the activation node 40 and the calculation node 42 by the service processor 50 in FIG. 3. Detailed descriptions of similar processes as those in FIG. 2 are omitted. FIG. 4 illustrates an example in which the waiting time tWAIT is optimally set similarly as in the control illustrated on the upper side in FIG. 2.

In FIG. 4, a time tSP(1)' indicates a setting process time of the activation node 40 when part of the setting process on the activation node 40 and part of the setting process on the calculation node 42 are overlapped with each other. A time tSP(N−1)' indicates a setting process time of the calculation node 42 when part of the setting process on the activation node 40 and part of the setting process on the calculation node 42 are overlapped with each other. (N−1) indicates that the number of the calculation nodes 42 is (N−1) when the number of all the nodes 40 and 42 in the network is set as N.

A time tDISK indicates a time of the activation process executed by the activation node 40 after the setting process on the activation node 40. For example, the time tDISK indicates a total of the activation process time in which the activation node 40 downloads the OS from the storage unit 24 of its own node and performs activation (execution) and a time used for a process for allowing download (transfer) of the OS by the calculation node 42. In other words, for example, the activation process by the activation node 40 includes an OS activation process for loading and executing the OS and a transfer setting process for allowing transfer of the OS to the calculation node 42 which is executed after the OS activation process. The OS activation process is an example of a program activation process. The OS downloaded from the storage unit 24 is developed on the memory 22.

Therefore, an activation completion timing corresponding to a timing when the activation process by the activation node 40 is completed becomes a completion timing of the transfer setting process. When the activation completion timing of the activation node 40 is set as the completion timing of the transfer setting process, the calculation node 42 may start the OS download immediately after the activation completion of the activation node 40. As a result, the time from when the service processor 50 starts the setting process on the activation node 40 until the OS activation by the calculation nodes 42 is completed may be shortened.

A time tNET indicates a time from when each of the calculation nodes 42 downloads the OS from the storage unit 24 of the activation node 40 until the activation of the OS is completed. A time difference corresponds to the gap to or the gap tB illustrated in FIG. 2 and is zero when the waiting time tWAIT is optimal.

An "entire node activation time" indicates a time from when the service processor 50 starts the setting process on the activation node 40 until the OS activation by the calculation nodes 42 is completed. A "setting process time of the calculation nodes" indicates a time from when the service processor 50 starts the setting process on the activation node 40 until the setting process on the calculation nodes 42 is completed.

Since the above-mentioned time difference becomes zero when the waiting time tWAIT is optimally set, Expression (1) is established.

$$tWAIT + tSP(N-1)' = tSP(1)' + tDISK \quad (1)$$

Since tSP(N−1)' and tSP(1)' are undiscovered variables that are not to be directly derived by the calculation, the optimal waiting time tWAIT is not calculated by using only Expression (1).

Figure 5:
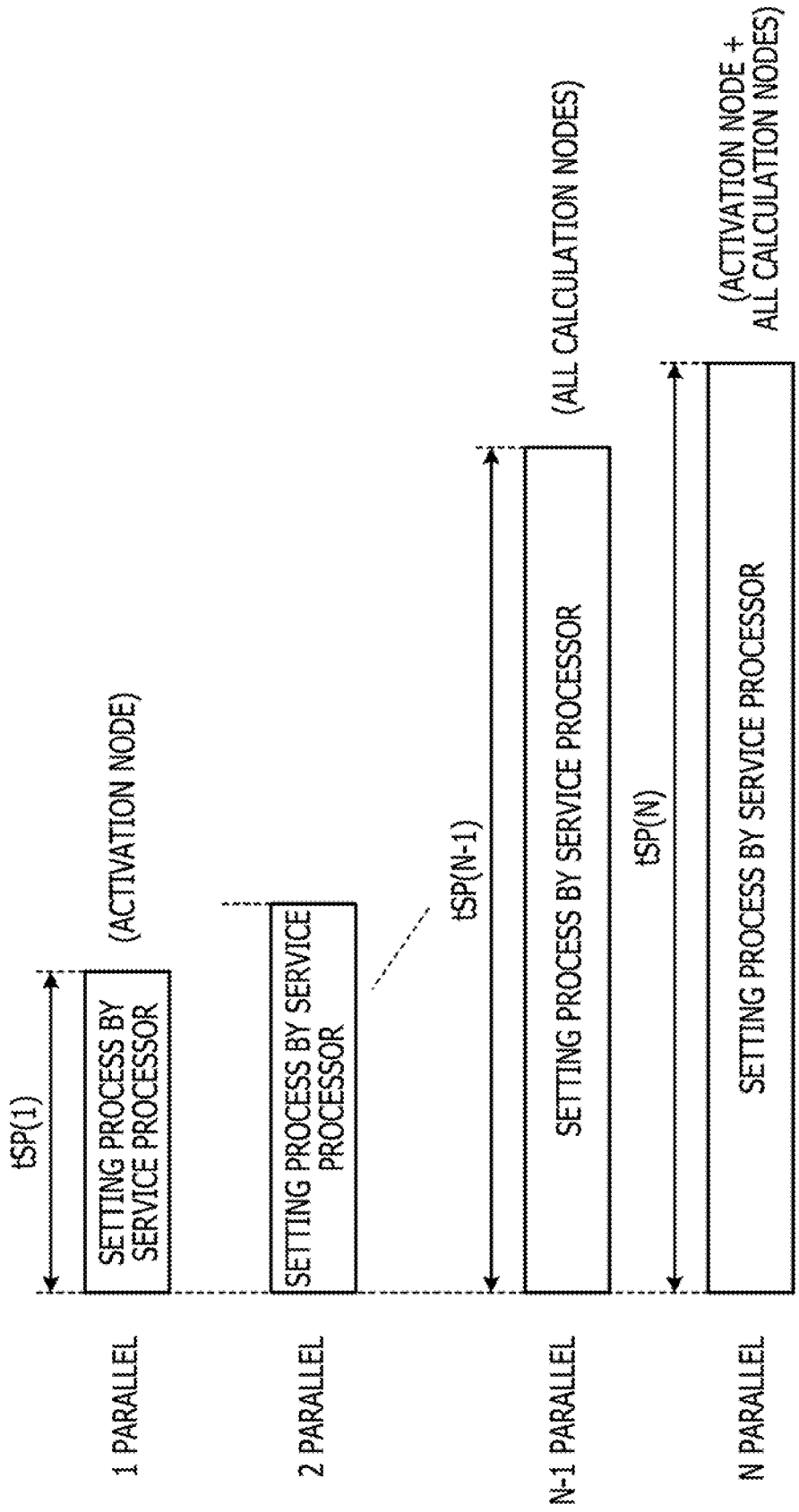
FIG. 5 is a diagram illustrating an example of a change in a setting process time in accordance with a parallel number of nodes.

FIG. 5 illustrates an example of a change in the setting process time in accordance with a parallel number of nodes 40 and 42. Loads (resources) used by the service processor 50 for the respective nodes 40 and 42 are reduced as the number of nodes 40 and 42 that execute the setting process in parallel is increased. For this reason, the setting process times of the respective nodes 40 and 42 are lengthened as the number of nodes 40 and 42 that execute the setting process in parallel is increased.

Contents of the setting process are similar to each other in the nodes 40 and 42. For this reason, in FIG. 5, the setting process time in one parallel is set as a setting process time tSP(1) used when the activation node 40 alone executes the setting process. When the setting process is started at the same time and also in columns with respect to the plurality of nodes 40 and 42, since the loads used by the service processor 50 for the respective nodes 40 and 42 become substantially the same, the setting process times become substantially the same in the respective nodes 40 and 42.

In FIG. 5, the setting process time used when the setting process on all the calculation nodes 42 (N−1 pieces) is executed in parallel is set as tSP(N−1). The setting process time used when the setting process on all the nodes 40 and 42 (N pieces) in the network is executed in parallel is set as tSP(N).

Figure 6:
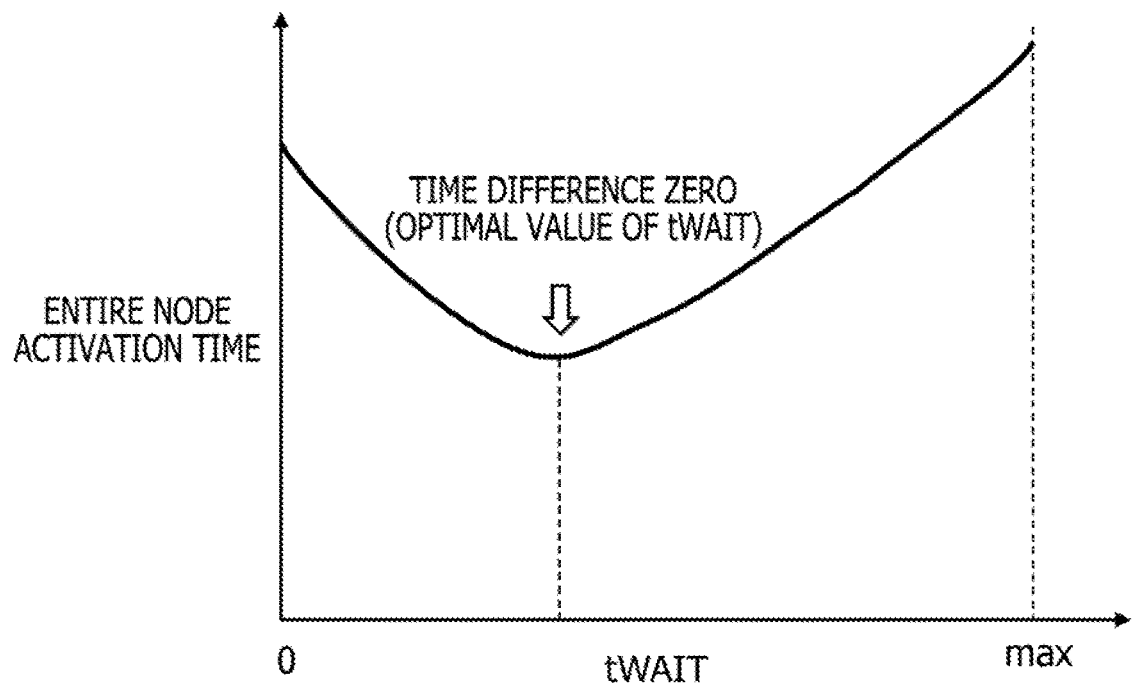
FIG. 6 is a diagram illustrating an example of a relationship between a waiting time and an entire node activation time.
Figure 6:
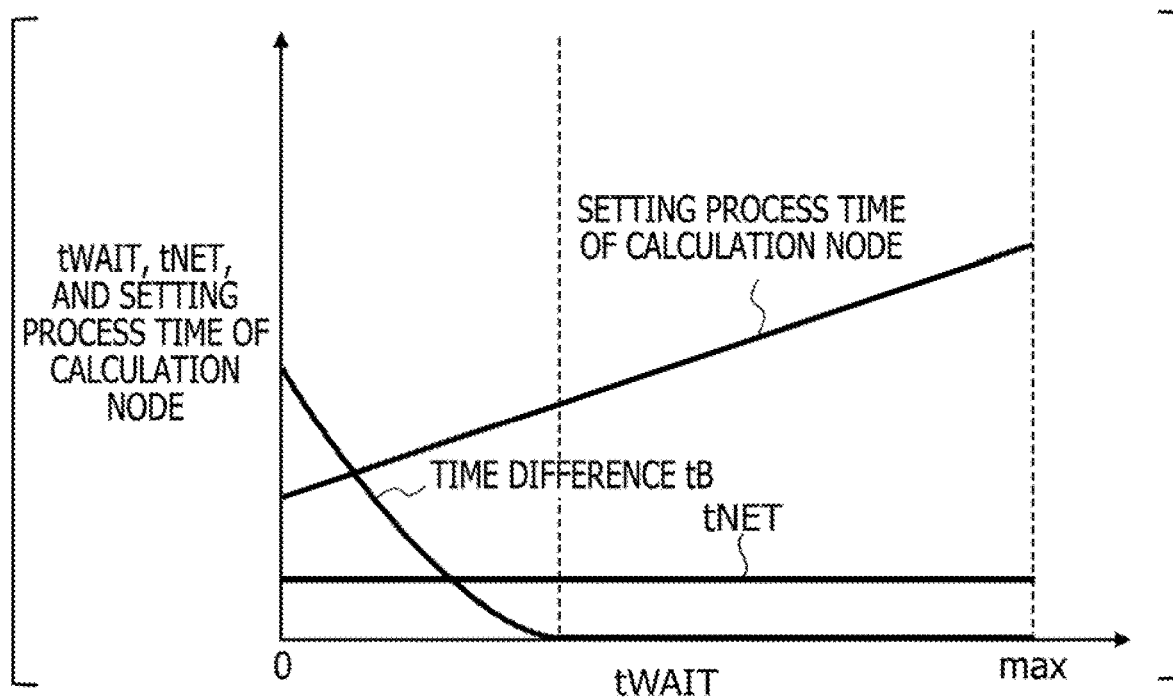

FIG. 6 illustrates an example of a relationship between the waiting time tWAIT and the entire node activation time. The entire node activation time indicates a time from when the service processor 50 starts the setting process on the activation node 40 until the OS activation by the calculation nodes 42 is completed as described in FIG. 4. In FIG. 6, max on a right edge indicates a timing when the completion of the setting process on the activation node 40 is matched with the start of the setting process on the calculation nodes 42.

As illustrated in contents enclosed in angle brackets on a lower side in FIG. 6, the entire node activation time is indicated by a sum of the setting process time on the calculation nodes 42 (FIG. 2), the gap tB (FIG. 2), and a tNET from when the respective calculation nodes 42 download the OS from the activation node 40 until the OS activation is completed. Since the setting process time of the calculation nodes 42 includes the waiting time tWAIT, the setting process time is lengthened as the waiting time tWAIT is longer. The gap tB is gradually decreased when the waiting time tWAIT approaches the optimal value from zero, and becomes a lowest value "0" when the waiting time tWAIT becomes the optimal value. Thereafter, when the waiting time tWAIT is further increased, the gap to (not illustrated) described in FIG. 2 is gradually increased from the lowest value "0".

The following will be described based on the contents illustrated in FIGS. 4 to 6. The waiting time tWAIT is longer than zero and shorter than the setting process time of the activation node 40. The setting process time tSP(1) when the activation node 40 alone executes the setting process is shorter than the setting process time tSP(1)' of the activation node 40 when the setting processes on the activation node 40 and the calculation nodes 42 are partially overlapped with each other. For this reason, Expression (2) is established.

The setting process time tSP(N−1) when the (N−1) calculation nodes 42 alone execute the setting process is not overlapped with the setting process time of the activation node 40. For this reason, the setting process time tSP(N−1) is shorter than the setting process time tSP(N−1)' of the activation node 40 when the setting processes on the (N−1) activation node 40 and calculation nodes 42 are partially overlapped with each other. The setting process time tSP(N−1)' of the (N−1) calculation nodes 42 is apparently shorter than the setting process time tSP(N) of the N calculation nodes 42. For this reason, Expression (3) is established. Expression (4) is further established from FIG. 4.

$$0 < tWAIT < tSP(1) < tSP(1)' \quad (2)$$

$$0 < tSP(N-1) < tSP(N-1)' < tSP(N) \quad (3)$$

$$0 < tDISK < tSP(N-1)' < tSP(N) \quad (4)$$

"tSP(N−1)'<tSP(N)" in Expression (4) is apparent from Expression (3).

With regard to "tWAIT<tSP(1)<tSP(1)'" in Expression (2), when "tSP(1)'" is approximated by an arithmetic average, Expression (5) is obtained. With regard to "tDISK<tSP(N−1)'<tSP(N)" in Expression (4), when "tSP(N −1)'" is approximated by an arithmetic average, Expression (6) is obtained. When "tSP(1)'" in (5) and "tSP(N−1)'" in (6) are assigned to Expression (1), Expression (7) is further obtained. In Expression (7), the waiting time tWAIT is approximated to zero when the value becomes a negative value, and is approximated to "tSP(1)" when the value becomes higher than or equal to tSP(1).

$$tSP(1)' \approx (tSP(1)' + tWAIT)/2 \quad (5)$$

$$tSP(N-1)' \approx (tSP(N) + tDISK)/2 \quad (6)$$

$$tWAIT \approx tSP(1) + (sDISK - tSP(N))/4 \quad (7)$$

Since the respective variables on a right term in Expression (7) may be measured, the waiting time tWAIT may be obtained by using Expression (7).

Since Expression (7) is an approximation expression, both the gaps tA and tB illustrated in FIG. 2 may not necessarily become zero by the waiting time tWAIT obtained from Expression (7). The gap tA occurs when the waiting time tWAIT is long, and the completion timing of the setting process on the calculation nodes 42 is later than the completion timing of the activation process on the activation node 40 (completion timing of tDISK). The gap tB occurs when the waiting time tWAIT is short, and the completion timing of the setting process on the calculation nodes 42 is earlier than the completion timing of the activation process on the activation node 40 (completion timing of tDISK).

Therefore, when the gap tA occurs, the waiting time tWAIT is shortened, and when the gap tB occurs, the waiting time tWAIT is lengthened, so that both the gaps tA and tB may be set to be closer to zero, and the waiting time tWAIT may converge to the optimal value. For example, the waiting time tWAIT may be updated by using Expression (8).

$$tWAIT(i+1) = tWAIT(i) + \alpha \times (tB(i) - tA(i)) \quad (8)$$

In Expression (8), a sign i indicates the number of updates (integer higher than or equal to 1), and tWAIT(0) in the case of i=0 indicates the initial waiting time tWAIT calculated by Expression (7). In the case of i=0, the gaps tA(i) and tB(i) are set as "0". α indicates a predetermined coefficient (for example, 0<α<1).

When the gap tA(i) occurs at the time of the setting of the i-th waiting time tWAIT(i), in accordance with Expression (8), a value obtained by multiplying the gap tA(i) by the coefficient α is subtracted from the waiting time tWAIT(i), and the next waiting time tWAIT(i+1) is decided. When the gap tB(i) occurs at the time of the setting of the i-th waiting time tWAIT(i), in accordance with Expression (8), a value obtained by multiplying the gap tB(i) by the coefficient α is added to the waiting time tWAIT(i), and the next waiting time tWAIT(i+1) is decided. The waiting time tWAIT is corrected in a direction in which the difference between the activation completion timing of the activation node 40 and the completion timing of the setting process on the calculation nodes 42 is decreased. When the gap tA(i) occurs, the gap tB(i) is "0", and when the gap tB(i) occurs, the gap tA(i) is "0".

The coefficient α is set to suppress non-convergence of the waiting time tWAIT when the gaps tA and tB alternately occur, and for example, a value between approximately 0.7 and approximately 0.9 is preferable. However, it is sufficient when the coefficient α is higher than "0" and lower than "1".

Figure 7:
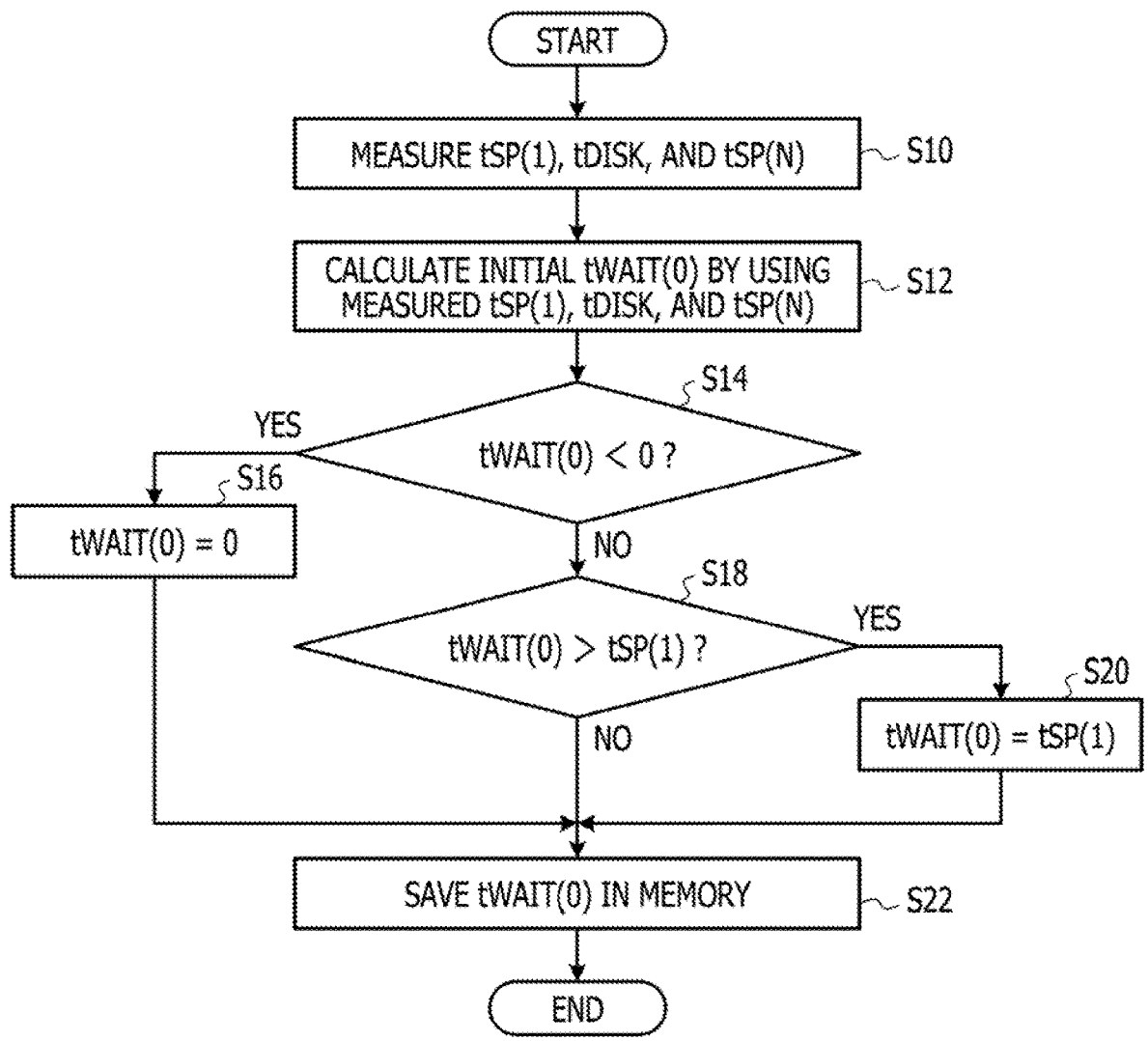
FIG. 7 is a diagram illustrating an example of an operation flow for setting an initial value of the waiting time which is executed by the service processor in FIG. 3.

FIG. 7 illustrates an example of an operation flow for setting an initial value of the waiting time tWAIT which is executed by the service processor 50 in FIG. 3. That is, for example, FIG. 7 illustrates an example of a node activation method by the service processor 50, illustrating an example of a node activation program executed by the service processor 50. For example, the process in FIG. 7 is executed when an operation mode of the parallel processing apparatus 102 is shifted from a normal mode to an examination mode in an inspection process before shipment of the parallel processing apparatus 102.

First, in step S10, the service processor 50 executes the setting process on only the activation node 40 to measure the setting process time tSP(1), and causes the activation node 40 to execute the OS activation process or the like following the setting process to measure the time tDISK. The service processor 50 executes the setting process on the activation node 40 and all the calculation nodes 42 at the same time and also in parallel to measure the setting process time tSP(N). Next, in step S12, the service processor 50 assigns the measured setting process times tSP(1) and tSP(N) and the time tDISK to Expression (7) to calculate the initial waiting time tWAIT(0).

Next, in step S14, the service processor 50 shifts the process to step S16 when the waiting time tWAIT(0) is a negative value and shifts the process to step S18 when the waiting time tWAIT(0) is higher than or equal to 0. In step S16, the service processor 50 sets the waiting time tWAIT(0) as "0" and shifts the process to step S22. In step S18, the service processor 50 shifts the process to step S20 when the waiting time tWAIT(0) is longer than the setting process time tSP(1) and shifts the process to step S22 when the waiting time tWAIT(0) is lower than or equal to the setting process time tSP(1).

In step S20, the service processor 50 sets the waiting time tWAIT(0) as the setting process time tSP(1) calculated in step S12 and shifts the process to step S22. In step S22, the service processor 50 saves the calculated or set waiting time tWAIT(0) in the nonvolatile memory 26 or the like and ends the process.

Figure 8:
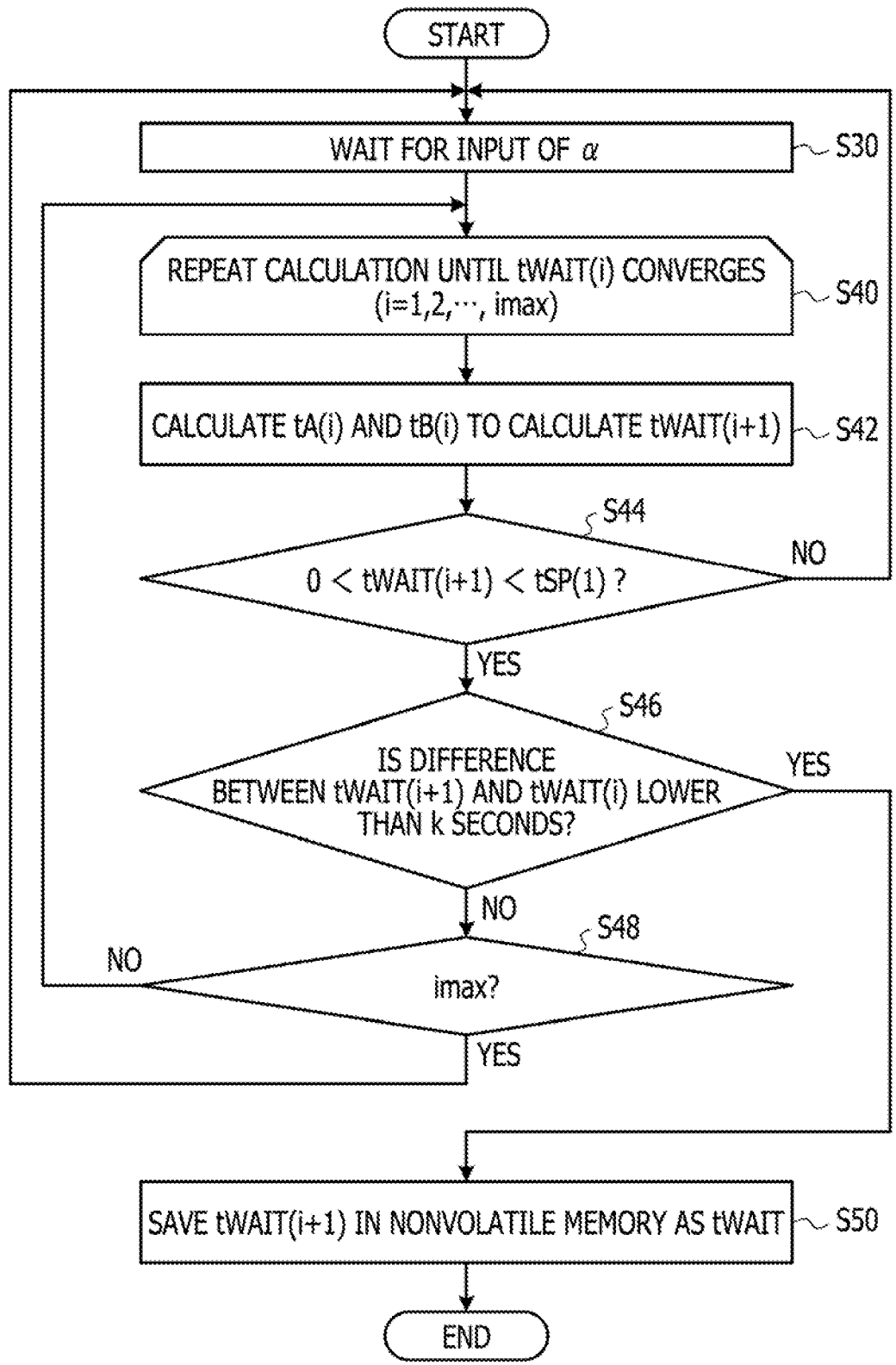
FIG. 8 is a diagram illustrating an example of an operation flow for causing the waiting time to converge which is executed by the service processor in FIG. 3.

FIG. 8 illustrates an example of an operation flow for causing the waiting time tWAIT to converge which is executed by the service processor 50 in FIG. 3. That is, for example, FIG. 8 illustrates an example of the node activation method by the service processor 50, illustrating an example of the node activation program executed by the service processor 50. For example, the process in FIG. 8 is executed when the operation mode of the parallel processing apparatus 102 is shifted from the normal mode to the examination mode in the inspection process before shipment of the parallel processing apparatus 102. The process in FIG. 8 may be executed following the process in FIG. 7 or may be executed after shipment of the parallel processing apparatus 102.

First, in step S30, the service processor 50 waits until the coefficient α is input to the parallel processing apparatus 102, and shifts the process to step S40 when the coefficient α is input. For example, the coefficient α is output from the control server 60 to the service processor 50.

In step S40, the service processor 50 repeats the operation between step S42 and step S48 until the waiting time tWAIT converges or the process reaches a repetition count imax. For example, the repetition count imax is approximately 10 times.

In step S42, the service processor 50 starts the setting process on the calculation nodes 42 after the waiting time tWAIT(i) elapses since the start of the setting process on the activation node 40 and measures the gaps tA(i) and tB(i). The service processor 50 assigns the measured gaps tA(i) and tB(i) to Expression (8) to calculate the waiting time tWAIT(i+1). In the case of i=0 (initial time), the service processor 50 uses the waiting time tWAIT(0) calculated in FIG. 7 and saved in the nonvolatile memory 26.

Next, in step S44, the service processor 50 determines that the coefficient α is not appropriate when the waiting time tWAIT(i+1) is lower than "0" or exceeds the setting process time tSP(1), and returns the process to step S30 to wait for the reinput of the coefficient α. The reinput of the coefficient α may be performed when the service processor 50 issues an input request to the control server 60. The service processor 50 determines that the coefficient α is appropriate when the waiting time tWAIT(i+1) is higher than or equal to "0" and lower than or equal to the setting process time tSP(1), and shifts the process to step S46.

In step S46, the service processor 50 determines that the waiting time tWAIT(i+1) has converged when a difference between the waiting time tWAIT(i+1) and the waiting time tWAITi is lower than k seconds, and shifts the process to step S50. When the processes in the step S40 to step S46 are repeatedly executed, the waiting time tWAIT may be corrected in a direction in which the difference between the activation completion timing of the activation node 40 and the completion timing of the setting process on the calculation nodes 42 is decreased.

The service processor 50 determines that the waiting time tWAIT(i+1) does not converge when the difference between the waiting time tWAIT(i+1) and the waiting time tWAITi is higher than or equal to k seconds, and shifts the process to step S48. For example, k second is an example of a first time, and when the entire node activation time illustrated in FIG. 4 is 20 minutes, k second is approximately 1 second. In this manner, it may be indirectly determined that the gap illustrated in FIG. 4 is decreased by using the waiting time tWAIT used for the activation process on the calculation nodes 42.

In step S48, the service processor 50 determines that the coefficient α is not appropriate when the waiting time tWAIT(i+1) does not converge even after the process reaches the repetition count imax, and returns the process to step S30 to wait for the reinput of the coefficient α. When the process does not reaches the repetition count imax, the service processor 50 returns the process to step S40.

In step S50, the service processor 50 saves the waiting time tWAIT(i+1) as the waiting time tWAIT in the nonvolatile memory 26 or the like and ends the process. Since the optimal waiting time tWAIT is decided based on the configuration of the parallel processing apparatus 102 (number of nodes), for example, the optimal waiting time tWAIT may be calculated once before shipping of the parallel processing apparatus 102 and held in the nonvolatile memory 26 or the like. When the activation node 40 and all the calculation nodes 42 are activated after shipping of the parallel processing apparatus 102, reference is made to the held waiting time tWAIT, and the activation node 40 and the calculation nodes 42 are sequentially activated.

Figure 9:
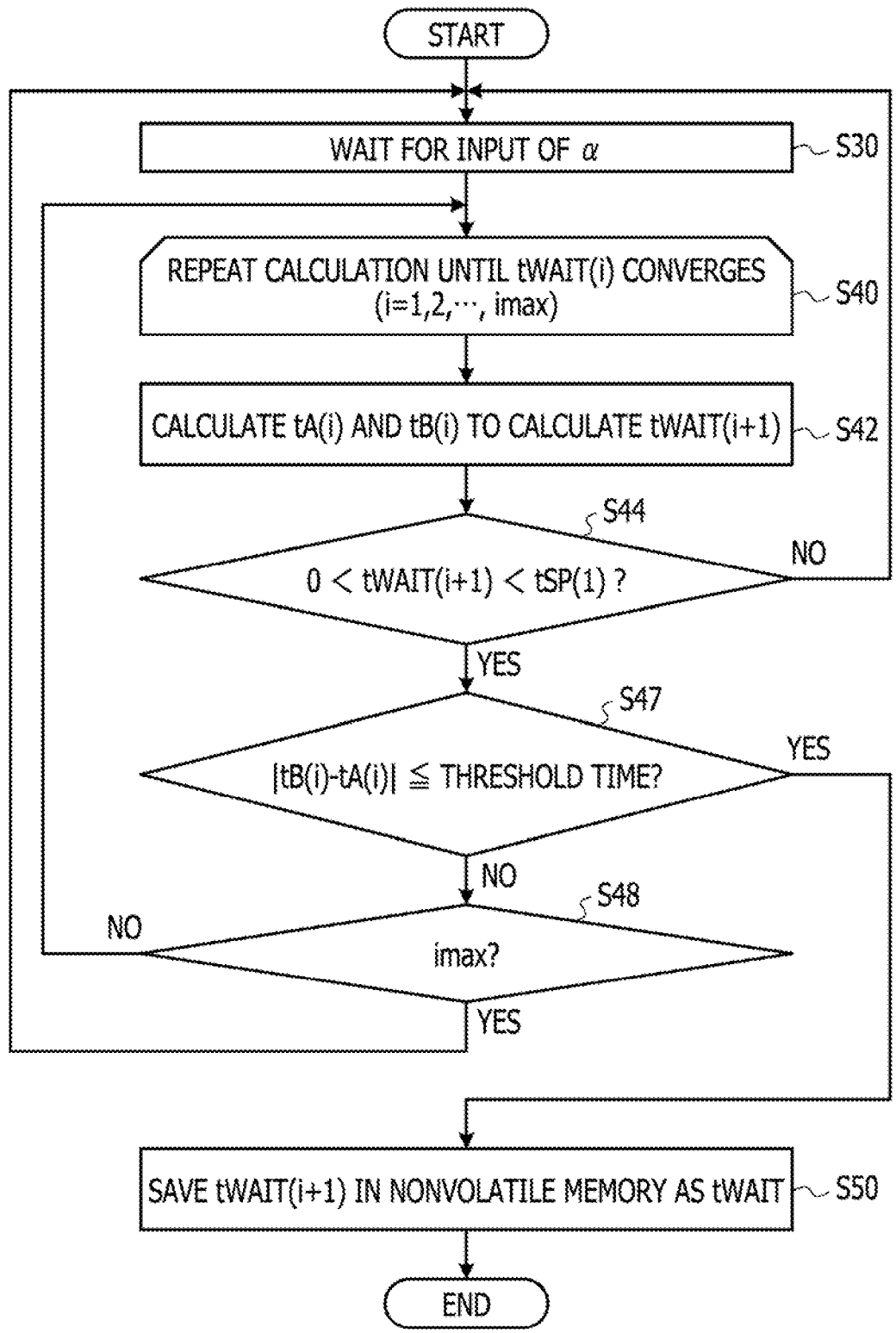
FIG. 9 is a diagram illustrating another example of the operation flow for causing the waiting time to converge which is executed by the service processor in FIG. 3.

The service processor 50 may determine that the waiting time tWAIT(i+1) has converged when the gaps tA(i) and tB(i) measured in step S42 become lower than or equal to the previously set predetermined threshold time. FIG. 9 illustrates an example in which the convergence of the waiting time tWAIT is determined by the gaps tA(i) and tB(i).

FIG. 9 illustrates an example of another operation flow for causing the waiting time tWAIT to converge which is executed by the service processor 50 in FIG. 3. FIG. 9 is the same process illustrated in FIG. 8 except that step S47 is executed instead of step S46 illustrated in FIG. 8.

In step S47, the service processor 50 shifts the process to step S50 when the difference (absolute value) between the gaps tB(i) and tA(i) becomes lower than or equal to the previously set threshold time. The service processor 50 shifts the process to step S48 when the difference (absolute value) between the gaps tB(i) and tA(i) is higher than the threshold time. For example, the threshold time is an example of the second time and is shorter than the gaps tA and tB illustrated in FIG. 2. When the processes in the step S40 to step S47 are repeatedly executed, the waiting time tWAIT may be corrected in a direction in which the difference between the activation completion timing of the activation node 40 and the completion timing of the setting process on the calculation nodes 42 is decreased.

As described with reference to FIG. 2, since any one of the gaps tB and tA becomes "0", the difference (absolute value) between the gaps tB(i) and tA(i) indicates any one of the gaps tB and tA. That is, for example, in step S47, the gap that is not "0" out of the gaps tB and tA is equal to or lower than the threshold time. The gaps tB(i) and tA(i) indicate a difference between the actual completion timing of the activation process on the activation node 40 and the actual completion timing of the setting process on the calculation nodes 42. For this reason, when the optimal value of the waiting time tWAIT is decided by comparison between the difference between the gaps tB(i) and tA(i) and the threshold time, the waiting time tWAIT with which the time difference illustrated in FIG. 4 is minimized may be obtained.

Figure 10:
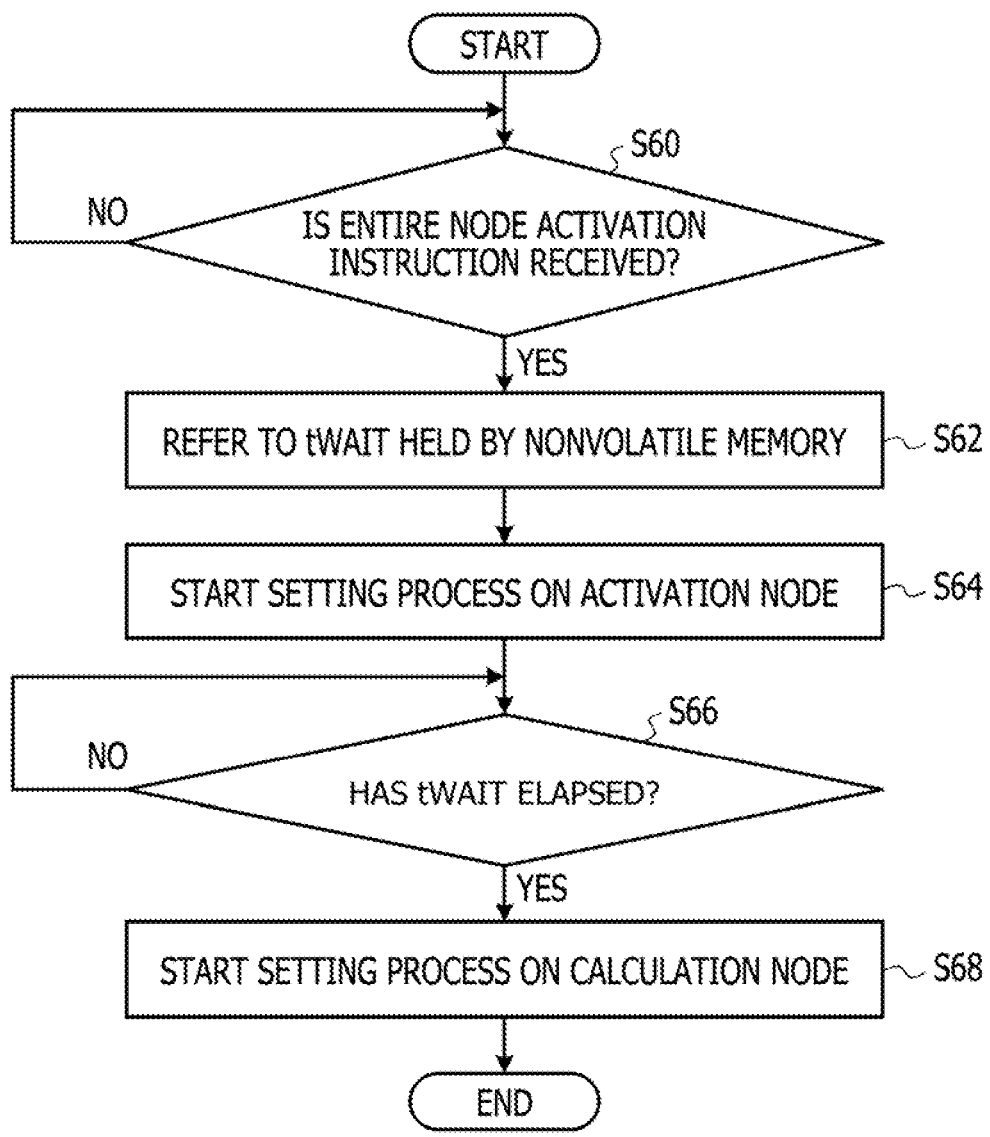
FIG. 10 is a diagram illustrating an example of an operation flow for an activation process on the parallel processing apparatus which is executed by the service processor in FIG. 3.

FIG. 10 illustrates an example of an operation flow for the activation process on the parallel processing apparatus 102 which is executed by the service processor 50 in FIG. 3. That is, for example, FIG. 10 illustrates an example of the node activation method by the service processor 50, illustrating an example of the node activation program executed by the service processor 50. For example, the process illustrated in FIG. 10 is executed in a state where the parallel processing apparatus 102 is set in the normal mode after shipping of the parallel processing apparatus 102.

First, in S60, the service processor 50 waits for reception of the activation instruction for activating the activation node 40 and all of the calculation nodes 42 from the control server 60 and shifts the process to step S62 when the activation instruction is received. In step S62, the service processor 50 refers to the waiting time tWAIT held in the nonvolatile memory 26. Next, in step S64, the service processor 50 starts the setting process on the activation node 40.

Next, in step S66, the service processor 50 waits for elapse of the waiting time tWAIT and shifts the process to step S68 based on the elapse of the waiting time tWAIT. Next, in step S68, the service processor 50 starts the setting process on the calculation nodes 42 and ends the process.

Thereafter, the activation node 40 the setting process of which has been completed earlier than the setting process on the calculation nodes 42 executes the OS activation process for activating the OS and the transfer setting process for enabling download of the OS by the calculation nodes 42. Since the waiting time tWAIT is optimized, the timing when the OS may be downloaded by the calculation nodes 42 becomes substantially equal to the completion timing of the setting process on the calculation nodes 42. The calculation nodes 42 downloads the OS from the activation node 40 based on the completion of the setting process by the service processor 50, and executes the activation process on the downloaded OS. As a result, as compared with a case where the waiting time tWAIT is not optimized, the entire node activation time from the start of the setting process on the activation node 40 until the completion of the OS activation process by the calculation nodes 42 may be shortened.

As described above, even in the embodiment illustrated in FIGS. 3 to 10, the effect similar to the effect of the embodiment illustrated in FIGS. 1 and 2 may be achieved. For example, the activation process on the calculation nodes 42 may be immediately started after the completion of the activation process on the activation node 40, and the time from when the activation instruction is issued until the information processing by the calculation nodes 42 becomes executable may be shortened. That is, for example, the activation time of the parallel processing apparatus 102 may be shortened.

In the embodiment illustrated in FIGS. 3 to 10, even when a variable that is not to be directly measured is included in the calculation expression for the waiting time tWAIT, the waiting time tWAIT may be calculated by using the approximate expression (7).

It may be determined whether or not the waiting time tWAIT approaches the optimal value based on the difference between the waiting times tWAIT(i+1) and tWAIT(i). In other words, for example, it may be indirectly determined that the time difference illustrated in FIG. 4 is decreased by using the waiting time tWAIT used for the activation process on the calculation nodes 42.

It may be determined whether or not the difference between the completion timing of the activation process on the activation node 40 and the completion timing of the setting process on the calculation nodes 42 is decreased based on the difference between the gaps tB(i) and tA(i). In other words, for example, the waiting time tWAIT with which the time difference illustrated in FIG. 4 is minimized may be obtained based on the difference between the actual completion timing of the activation process on the activation node 40 and the actual completion timing of the setting process on the calculation nodes 42.

When both the gaps to and tB are used, whichever the activation completion timing of the activation node 40 or the completion timing of the transfer setting on the calculation nodes 42 is earlier, control for setting both the timings be closer to each other may be executed.

FIG. 11 illustrates an example of the operation flow for causing the waiting time tWAIT to converge which is executed by the service processor 50 of the parallel processing apparatus according to another embodiment. Detailed description of components and functions similar to the components and the functions described in FIGS. 1 to 10 is omitted. The parallel processing apparatus including the service processor 50 which executes the process in FIG. 11 includes similar components and similar functions to those of the parallel processing apparatus 102 illustrated in FIG. 3 except that the node activation program executed by the service processor 50 is different. For example, the operation flow for setting the initial value of the waiting time tWAIT which is executed by the service processor 50 is the same as FIG. 7, and the operation flow for the activation process on the parallel processing apparatus 102 which is executed by the service processor 50 is the same as FIG. 10.

In the operation flow illustrated in FIG. 11, step S45 is inserted between step S44 and step S46 in FIG. 8, and step S452 and step S442 that is executed at the time of determination as "No" in step S44 are added to FIG. 8. The other processes are similar to those in FIG. 8. The same or similar processes similar to those in FIG. 8 are assigned with the same step numbers as those in FIG. 8.

In step S42, similarly as in FIG. 8, the service processor 50 starts the setting process on the calculation nodes 42 after the waiting time tWAIT(i) elapses since the start of the setting process on the activation node 40 and measures the gaps tA(i) and tB(i). The service processor 50 assigns the measured gaps tA(i) and tB(i) to Expression (8) to calculate the waiting time tWAIT(i+1).

Next, in step S44, the service processor 50 determines that the coefficient α is not appropriate when the waiting time tWAIT(i+1) is lower than "0" or exceeds the setting process time tSP(1), and returns the process to step S442. The service processor 50 determines that the coefficient α is appropriate when the waiting time tWAIT(i+1) is higher than or equal to "0" and lower than or equal to the setting process time tSP(1), and shifts the process to step S45.

In step S442, the service processor 50 decreases the coefficient α (for example, the current coefficient α is multiplied by 0.9) and shifts the process to step S42. In this case, in step S42, the service processor 50 discards the waiting time tWAIT(i) calculated using the current coefficient α and calculates the waiting time tWAIT(i) using the new coefficient α. The coefficient α may be set as a value other than the value obtained by multiplying 0.9 (for example, the current coefficient α is multiplied by 0.95 or 0.85). The coefficient α satisfies $0 < \alpha < 1$.

In step S45, the service processor 50 determines whether or not the difference (absolute value) between the gaps tB(i) and tA(i) is lower than the previous difference (absolute value) between the gaps tB(i−1) and tA(i−1). When the difference between the gaps tB(i) and tA(i) is lower than the previous difference between the gaps tB(i−1) and tA(i−1), the service processor 50 determines that the waiting time tWAIT starts converging and shifts the process to step S46. When the difference between the gaps tB(i) and tA(i) is higher than or equal to the previous difference between the gaps tB(i−1) and tA(i−1), the service processor 50 determines that the waiting time tWAIT does not start converging and shifts the process to step S452. The service processor 50 writes the measured gaps tB(i) and tA(i) in the nonvolatile memory 26 or the like each time the gaps tB(i) and tA(i) are measured.

In step S452, the service processor 50 decreases the coefficient α (for example, the current coefficient α is multiplied by 0.9) similarly as in step S442 and shifts the process to step S42. In this case, in step S42, the service processor 50 discards the waiting time tWAIT(i) calculated using the current coefficient α and calculates the waiting time tWAIT(i) using the new coefficient α.

In steps S442 and S452, when the service processor 50 changes the value of the coefficient α, the calculation process on the waiting time tWAIT may be continued without waiting for the input of the coefficient α from the outside. As a result, the time until the optimal waiting time tWAIT is calculated may be shortened, and for example, costs in the examination step of the parallel processing apparatus may be reduced.

Thus, also according to the embodiment illustrated in FIG. 11, the same effect as that of the embodiment illustrated in FIGS. 1 to 10 may be attained. According to the embodiment illustrated in 11, when it is determined that the coefficient α is not appropriate, the service processor 50 may change the value of the coefficient α without waiting for the input of the coefficient α from the outside. For this reason, the update frequency of the calculation process on the waiting time tWAIT may be increased, and the time until the optimal waiting time tWAIT is calculated may be shortened. According to this, for example, the costs in the examination step of the parallel processing apparatus may be reduced.

The characteristics and advantages of the embodiments become apparent from the above detailed description. This is intended to extend to the features and advantages of the embodiments as described above as long as the claims are not departing from the gist of the claims and the scope of right. Also, one skilled in the art is able to easily make any modifications and changes. Therefore, it is not intended that the scope of the embodiments having inventiveness be limited to the aforementioned embodiments, and it is possible to be based on appropriate modifications and equivalents included in the scope disclosed in the embodiments.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A parallel processing apparatus comprising:
a first node including a processor and a storage unit that stores a program, the first node being activated when the program loaded from the storage unit is executed;
a second node including a processor and configured to be activated when the program loaded from the storage unit of the first node is executed; and
a controller configured to execute, for each of the first node and the second node, a setting process for setting a state where the program may be loaded,
the controller starts the setting process on the second node after a predetermined time elapses since start of the setting process on the first node, and
the predetermined time is determined such that an activation completion timing of the first node is aligned with a completion timing of the setting process on the second node,
the predetermined time is a time obtained by adding a setting process time when the setting process is executed only on the first node to a value obtained by dividing a time that is obtained by subtracting a setting process time when the setting processes on the first node and the second node are executed in parallel from an activation time of the first node executed after the setting process on the first node by "4".

2. The parallel processing apparatus according to claim 1, wherein the controller is configured to:

measure a first difference being a difference between the time at which the activation completion timing of the first node and the completion timing of the setting process on the second node, and when a second difference being a difference between the predetermined time before the adjusting and the predetermined time after the adjusting is greater than or equal to a first time, the controller updates the predetermined time in a direction in which a third difference being a difference between the activation completion timing of the first node and the completion timing of the setting process on the second node is decreased.

3. The parallel processing apparatus according to claim 1, wherein, when a difference between the activation completion timing of the first node and the completion timing of the setting process on the second node is not contained in a second time, the control unit corrects the predetermined time in a direction in which the difference between the activation completion timing of the first node and the completion timing of the setting process on the second node is decreased.

4. The parallel processing apparatus according to claim 2, wherein the control unit lengthens the predetermined time when the activation completion timing of the first node is later than the completion timing of the setting process on the second node, and shortens the predetermined time when the activation completion timing of the first node is earlier than the completion timing of the setting process on the second node.

5. The parallel processing apparatus according to claim 1, wherein the activation process executed by the first node after the setting process includes a program activation process for loading and executing the program and a transfer setting process for enabling transfer of the program to the second node which is executed after the program activation process, and
wherein the completion timing of the activation process on the first node is a completion timing of the transfer setting process.

6. A node activation method implemented by a parallel processing apparatus that includes a first node including a processor and a storage unit that stores a program, the first node being activated when the program loaded from the storage unit is executed, and a second node including a processor and configured to be activated when the program loaded from the storage unit of the first node is executed, the node activation method comprising:
starting a setting process for setting a state where the program may be loaded to the first node; and
starting the setting process on the second node after a predetermined time elapses since start of the setting process on the first node,
the predetermined time is determined such that an activation completion timing of the first node is aligned with a completion timing of the setting process on the second node,
the predetermined time is a time obtained by adding a setting process time when the setting process is executed only on the first node to a value obtained by dividing a time that is obtained by subtracting a setting process time when the setting processes on the first node and the second node are executed in parallel from an activation time of the first node executed after the setting process on the first node by "4".

7. A non-transitory computer-readable storage medium for storing a node activation program which causes a parallel processing apparatus to perform processing, the parallel processing apparatus having a first node and a second node, the first node including a processor and a storage configured to store a program and being configured to be activated when the program loaded from the storage is executed, the second node including a processor and configured to be activated when the program loaded from the storage of the first node is executed, the processing comprising:
   starting a setting process for setting a state where the program may be loaded to the first node; and
   starting the setting process on the second node after a predetermined time elapses since start of the setting process on the first node,
   the predetermined time is determined such that an activation completion timing of the first node is aligned with a completion timing of the setting process on the second node,
   the predetermined time is a time obtained by adding a setting process time when the setting process is executed only on the first node to a value obtained by dividing a time that is obtained by subtracting a setting process time when the setting processes on the first node and the second node are executed in parallel from an activation time of the first node executed after the setting process on the first node by "4".

* * * * *